United States Patent
Ruhnau

[15] 3,677,442
[45] July 18, 1972

[54] MACHINE FOR DELIVERING MULTI-COMPONENT PLASTICS MIXTURE

[72] Inventor: Joachim Ruhnau, Auf der Heide 11, 3001 Isernhagen Hohenhorster Baurschaft, Germany

[22] Filed: Feb. 18, 1970

[21] Appl. No.: 12,340

[30] Foreign Application Priority Data
Feb. 19, 1969 Germany ..................... P 19 08 210.1

[52] U.S. Cl. ................................................ 222/70, 18/30
[51] Int. Cl. ............................................................ B67d 5/08
[58] Field of Search ............... 222/70, 135, 145; 18/13 C, 18/30 C–30 CV; 137/565, 569

[56] References Cited
UNITED STATES PATENTS 3,509,600  5/1970  Noble .................................. 18/30 CK
3,409,174  11/1968  Radcliffe .............................. 222/70
3,119,527  1/1964  Dyer .................................... 222/70

Primary Examiner—Robert B. Reeves
Assistant Examiner—Thomas E. Kocovsky
Attorney—Clelle W. Upchurch

[57] ABSTRACT

An apparatus is provided for mixing components which will react together to form a plastic such as a polyurethane foam that combines a mixer with an axial piston pump which normally circulates a component but delivers metered amounts of the component to the mixer when it is reversed by a piston actuated in an air cylinder a predetermined interval of time by a valve controlled by an electric timer.

2 Claims, 1 Drawing Figure

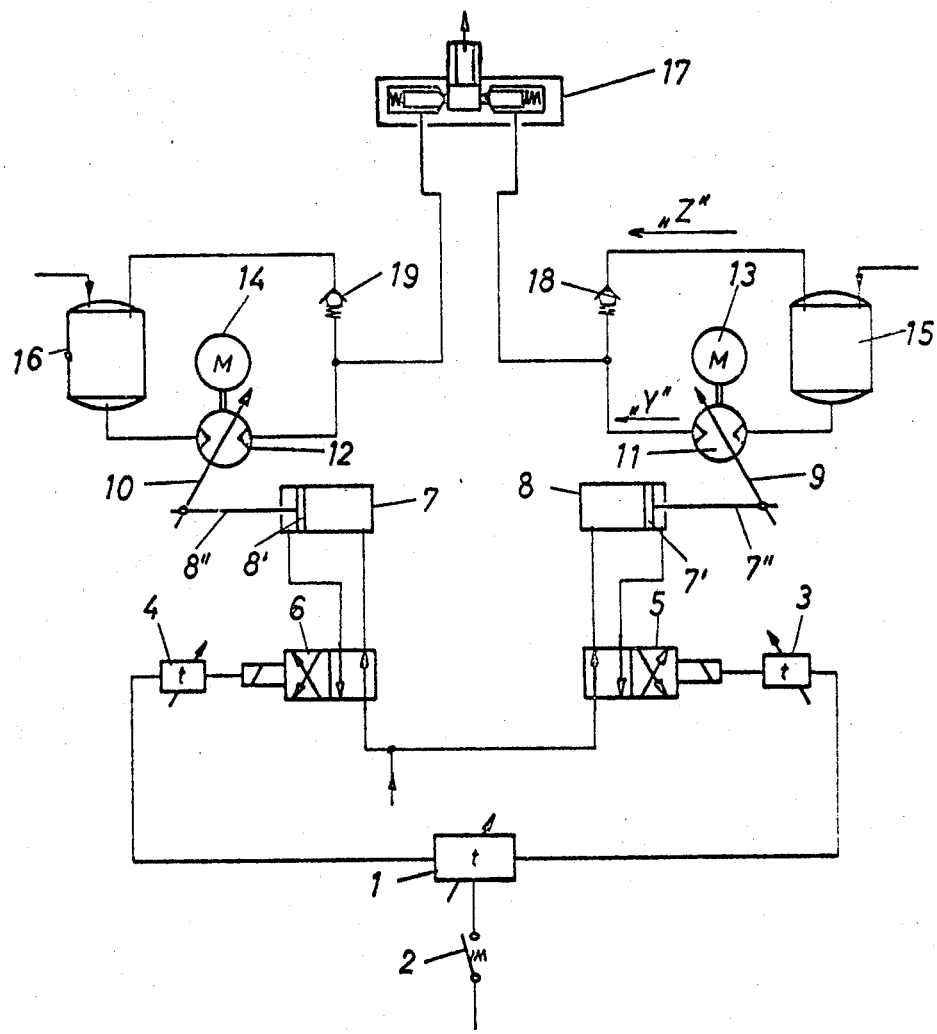

MACHINE FOR DELIVERING MULTI-COMPONENT PLASTICS MIXTURE

The invention relates to a machine for delivering multi-component plastics mixtures, particularly expanded polyurethane compositions, in which the components necessary for producing the plastics materials are fed from reservoirs to a mixing chamber by means of conjointly driven feed or proportioning pumps. The components of the mixture are for this purpose injected under high pressure into the mixing chamber by high speed piston pumps. The feeding of a regulated amount of the components into the mixing chamber is then generally controlled by time controlled magnetic clutches which can be operated from a control unit and which effect the adjustment of the pump elements.

With these known machines and their accessory equipment it is possible for the plastics mixture to be ejected in metered quantities and with intermittent, rapid shot sequence from the mixing chamber into moulds or hollow bodies without interrupting the running stream of mixture and the consequent clogging of the mixture chamber. It has however been found that by the use of a time controlled coupling system, particularly in the form of magnetic clutches, the amount of equipment required in known devices is substantially increased, with consequent increased cost. Because they are highly stressed, these coupling devices are also relatively highly liable to wear and failure. The necessary quantitative delivery of the mixture from the mixing chamber in continuous succession is therefore not always ensured without the mixture running ahead or lagging behind in an undesirable manner.

The invention is intended to obviate the disadvantages of known machines and to provide a delivery device of simple construction.

According to the invention this problem is solved by providing adjustable swash-plate axial piston pumps for delivering and then metering the plastics components, the adjustment of the swash-plate being effected by a compressed air piston preceding the pump.

In a special development of the invention the compressed air pistons are controllable by means of solenoid valves operated by an electric time clock for the purpose of compensating for excessive or deficient delivery amounts.

The advantages achieved by means of the invention consist particularly in that the expensive magnetic clutches used hitherto can be replaced by a reliably operating feed or metering pump system together with its control means.

An example of embodiment of the invention is illustrated diagrammatically in the accompanying drawings and described more fully below;

The FIGURE is a diagrammatic illustration of one embodiment of the invention.

On the machine there is provided a main time clock 1 which is operated by a switch 2 closing the circuit. The time clock determines the shot time for the amounts of plastics material to be delivered at a time. The shot time can be adjustable from 0.5 to 30 seconds. Time delay elements 3 and 4 are provided in the circuit and with their aid, on the starting-up of the time clock 1, the reversing valves 5 and 6 are reversed and the control pistons 7' and 8' guided in the compressed air cylinders 7 and 8 are operated. The piston rods 7'' and 8'' are connected to levers 9 and 10 respectively, and with the aid of this linkage the swash-plate (not shown) of respective axial piston pumps 11 and 12 is displaced abruptly by the high air pressure prevailing in the cylinders 7 and 8. The time elements 3 and 4 serve to control running ahead. When the switch 2 has been switched off and the circuit is without current, the adjustable axial piston pumps effect circulation. During circulation pumping the pumps deliver in the direction of the arrow Z. On the operation of the switch 2 the adjustable axial piston pumps 11 and 12 are reversed in respect of direction of delivery by means of the air cylinders 7 and 8. The adjusting levers 9 and 10 of the pumps can be limited in respect of their deflections by means of a mechanical adjusting device, so that the delivery volume of both pumps can be adjusted continuously and independently of one another. The pumps then deliver from the appertaining reservoirs 15 and 16 in the direction of the arrow Y to the mixing head 17. Return to the reservoirs of the delivery medium is prevented by the check valves 18 and 19. During operation the drive motors 13 and 14 continue to work with constant rotational speed, so that connection and disconnection, and consequently special coupling devices, are not required.

What we claim is:

1. An apparatus for mixing components together which will react to form a plastic material, said apparatus combining a mixer with a means for delivering to the mixer each component which is to be mixed with another, said delivery means comprising a reservoir, an axial piston pump and means for driving the piston pump, said piston pump normally withdrawing component and delivering it back into the reservoir, means for reversing the pump and delivering liquid into the mixer for a measured length of time comprising a cylinder, a piston in the cylinder having a piston rod, said piston rod being attached to the pump whereby the direction of the pump is reversed when the piston in the cylinder is actuated, and means for actuating the piston in the cylinder comprising a source of aid under pressure and a valve responsive to a timer which directs flow of air into the cylinder.

2. The apparatus of claim 1 wherein the valve is a solenoid valve.

* * * * *